United States Patent [19]

Gimmler et al.

[11] Patent Number: 5,523,106
[45] Date of Patent: Jun. 4, 1996

[54] JUICE-BASED EXPANDED SNACKS AND PROCESS FOR PREPARING THEM

[75] Inventors: Norbert Gimmler, Ringwood; Harry Levine; Louise Slade, both of Morris Plains; Hamed A. Faridi, Parsippany; Robert M. Sauer, Jr., West Milford, all of N.J.

[73] Assignee: Nabisco, Inc., Parsippany, N.J.

[21] Appl. No.: 191,971

[22] Filed: Feb. 3, 1994

[51] Int. Cl.[6] ..................................... A23L 1/068
[52] U.S. Cl. .................. 426/549; 426/302; 426/560; 426/599; 426/640; 426/808
[58] Field of Search .................................. 426/302, 549, 426/560, 599, 808, 640, 590, 578

[56] References Cited

U.S. PATENT DOCUMENTS

| | | | |
|---|---|---|---|
| 1,512,731 | 10/1924 | Washington | 426/96 |
| 2,082,312 | 6/1937 | Todd | 426/660 |
| 2,147,238 | 2/1939 | Bruce | 426/599 |
| 2,855,315 | 10/1958 | Perrozzi et al. | 426/96 |
| 2,856,291 | 10/1958 | Schultz | 426/534 |
| 2,899,313 | 8/1959 | Makower et al. | 426/321 |
| 3,041,180 | 6/1962 | Swisher | 426/96 |
| 3,930,027 | 12/1975 | Kelly et al. | 426/28 |
| 3,971,852 | 7/1976 | Brenner et al. | 426/103 |
| 3,998,977 | 12/1976 | Rabeler | 426/144 |
| 4,017,644 | 4/1977 | Jokay | 426/540 |
| 4,086,367 | 4/1978 | Ziccarelli | 426/98 |
| 4,156,020 | 5/1979 | Bohrmann et al. | 426/96 |
| 4,205,093 | 5/1980 | Blake | 426/333 |
| 4,284,652 | 8/1981 | Christensen | 426/72 |
| 4,515,822 | 5/1985 | Kraig et al. | 426/445 |
| 4,609,555 | 9/1986 | Becher et al. | 426/94 |
| 4,610,890 | 9/1986 | Miller et al. | 426/651 |
| 4,689,235 | 8/1987 | Barnes et al. | 426/89 |
| 4,707,367 | 11/1987 | Miller et al. | 426/96 |
| 4,753,816 | 6/1988 | Vink et al. | 426/660 |
| 4,837,042 | 6/1989 | Vajda et al. | 426/615 |
| 4,889,730 | 12/1989 | Roberts et al. | 426/102 |
| 5,009,900 | 4/1991 | Levine et al. | 426/96 |
| 5,015,489 | 5/1991 | Van Lengerich et al. | 426/549 |
| 5,087,461 | 2/1992 | Levine et al. | 426/96 |
| 5,093,146 | 3/1992 | Calandro et al. | 426/619 |
| 5,124,162 | 6/1992 | Boskovic et al. | 426/94 |
| 5,132,127 | 7/1992 | Wisdom | 426/549 |
| 5,248,515 | 9/1993 | Payton et al. | 426/599 |
| 5,264,238 | 11/1993 | Taga et al. | 426/640 |
| 5,264,239 | 11/1993 | Cornet et al. | 426/641 |
| 5,320,858 | 6/1994 | Fazzolare et al. | 426/549 |

OTHER PUBLICATIONS

Matz, *Cookie and Cracker Technology*, The AVI Publishing Co., Inc., pp. 122–123 (1968).
Levine and Slade, "A Polymer Physico–chemical Approach To The Study Of Commercial Starch Hydrolysis Products (SHPs)", *Carbohydrate Polymers*, vol. 6, pp. 213–244 (1986).
Atwell, et al, "The Terminology And Methodology Associated With Basic Starch Phenomenon", *Cereal Foods World*, vol. 33, No. 3, pp. 306–311 (Mar. 1988).
Risch, "Encapsulation Of Flavors By Extrusion", *Flavor Encapsulation*, American Chemical Society, 1988, pp. 103–109.
Manufacturer's Literature—Bucher, "Drying Technique", Jan. 1993.
Manufacturer's Literature—Zwag (Zschokke Wartmann Ltd.), "DryVac".
"Swiss vacuum band drying process succeeds in first American use", Reprint from Food Engineering, May 1987.

*Primary Examiner*—Donald E. Czaja
*Assistant Examiner*—Lien Tran

[57] ABSTRACT

A shelf-stable, crispy snack is produced from a fruit or vegetable juice or juice concentrate. The juice or juice concentrate is admixed with ingredients comprising a starch hydrolysis product and a pregelatinized starch to form a dough or dough-like mixture, which forms a cellular or crumb-like structure upon vacuum drying to a shelf stable moisture content. The glass transition temperature of the snack food product is at least about 30° C. The dough-like mixture may be formed into pieces before, during, or after expansion to obtain products having a cracker-like or cookie-like texture and appearance. The dough-like mixture is heated to temperatures above its glass transition temperature to expand it by evaporation of water. However, the dough temperature is kept below temperatures which would result in substantial decomposition or loss of nutritive, color, or flavoring components of the juice or juice concentrate.

25 Claims, 2 Drawing Sheets

JUICE-BASED EXPANDED SNACKS AND PROCESS FOR PREPARING THEM

FIELD OF THE INVENTION

The present invention relates to the production of juice-based snacks having a cracker-like, cookie-like or extruded snack-like texture and appearance.

BACKGROUND OF THE INVENTION

Fruit and vegetable juices are natural sources of nutritious compounds such as vitamins and minerals as well as sources of tasteful flavors. Unfortunately, the high water content of juices contributes significantly to their transportation, handling, and storage costs. To alleviate these problems, juices have been concentrated or converted to solid forms for reconstitution or for use as an ingredient in other foods. However, the generally heat labile nature and high volatility of the nutritive, color, and flavor components of juices results in excessive losses at the elevated temperatures encountered during baking.

U.S. Pat. No. 1,512,731 to Washington discloses a method of making a powdered instant drink mix by subjecting a mixture of fruit juice and sugar to vacuum at low pressure. The resulting foam-like mass of bubbles is crushed to obtain a powder. A fruit flavored drink is formed by mixing the powdered drink mix with water.

U.S. Pat. No. 2,147,238 to Bruce discloses a method of treating fruit juices in order to make these juices easier to handle and store. The method comprises supersaturating fruit juice with dextrose and permitting the supersaturated solution to crystallize to a solid or substantially solid form. The resulting product may then be diluted to provide a beverage, utilized to flavor gelatine deserts, ices and the like or used in the preparation of jams or jellies.

U.S Pat. Nos. 4,610,890 and 4,707,367 to Miller et al. disclose a method of making a solid flavoring composition. The method entails forming an aqueous mixture of a sugar, a starch hydrolysate and an emulsifier, heating the mixture and then combining the aqueous mixture with an essential oil flavor in order to form a homogenous melt, extruding the homogenous melt into a cool solvent, and then drying the melt in a vacuum oven to remove surface solvent. The resulting particulate products are then used to flavor beverage and food products.

The encapsulation of essential oils and flavorings in matrices comprising sugar and starch hydrolyzates is disclosed in U.S. Pat. Nos. 3,041,180, 4,689,235, 5,009,900, 5,087,461 and 5,124,162. These solid products are flavoring agents and are either mixed with a carrier such as water or other food ingredients rather than being consumed in bite size pieces as a snack. In addition, they generally dissolve rapidly and would not provide a long lasting crispy texture which is similar to that of an expanded snack, cracker or cookie.

Fruit juice based hard candy is disclosed in U.S. Pat. No. 4,753,816. The product has a fruit solid content of about 5 to 25% and an added sugar component content of about 70 to about 95%. While these juice based products would take a considerable time to dissolve in the mouth, they do not provide the expanded texture and mastication properties of a cookie or cracker.

U.S. Pat. No. 5,264,238 discloses production of snack foods from a moldable vegetable or fruit paste using a two step drying process at temperatures of 80° C. to 160° C. to maintain the color and taste of the natural ingredients. Production of an expanded product having a cellular or cookie crumb-like structure is not disclosed.

U.S. Pat. No. 5,132,127 discloses the production of an extruded snack food wherein all or substantially all of the moisture is derived from the flavor source. The high moisture material may be a fruit juice or a vegetable juice. It is mixed with a farinaceous base such as a meal flour, or starch to produce a dough comprising about 25% to about 50% moisture. The dough is extruded at a barrel pressure of at least 200 psi and a temperature of at least 200° F. within the barrel. The extrudate is dried and is then ultimately cooked by frying at a temperature above 220° F. or by hot air puffing at a temperature of 400° F. to 475° F. These high temperatures would destroy or volatilize substantial amounts of the nutritive, flavor and color components of the juices.

The present invention provides a low fat snack product that may exhibit the texture of a cookie, cracker or expanded snack, but provides the flavor and color of fruit or vegetable juice. The products exhibit low hygroscopicity, long shelf life, and a long-lasting crispy mouthfeel. The method of the present invention results in a cellular or cookie crumb-like structure in a crispy snack while retaining much of the inherent flavor and color of the original juice.

SUMMARY OF THE INVENTION

The present invention provides a snack food having the flavor of either fruit or vegetable juice with the substance of a snack food. By altering the amounts of juice, starch hydrolysate, gelatinized starch, and optional pre-baked particulates and water, the final texture, mouthfeel and cell structure of the resulting food product may be controlled to resemble that of a cookie, cracker or expanded snack. The gelatinized starch imparts a longer lasting mouthfeel to the snack product and increases its mastication properties.

In embodiments of the present invention the snack may be produced by admixing fruit or vegetable juice or juice concentrate, a starch hydrolysate such as maltodextrin, a gelatinized starch such as pregelatinized wheat or corn starch, optional water, and optional pre-baked particulates. The resulting mixture may then be mixed to form a dough or dough-like mixture. The dough is dried and expanded in a vacuum dryer at a temperature which is low enough so as to avoid substantial destruction of the nutritive and flavor components and coloring of the original fruit or vegetable juice. Exemplary vacuum dryer temperatures for the products range from about 30° C. to about 75° C. The dough may be formed into bite-sized or snack sized pieces prior to or upon entry into the vacuum oven. In other embodiments, the dough may be shaped in the vacuum oven, for example, by molding before and/or during expansion. Then the expanded product may be cut or formed into bite-sized or snack-sized pieces before or after exiting the vacuum oven. The glass transition temperature (Tg) of the final product is above room temperature and may be in the range of about 30° C. to about 60° C. The moisture content of the dough or dough-like mixture may be reduced in the vacuum dryer to less than about 10% by weight, preferably less than about 5% by weight, most preferably less than about 3% by weight.

DETAILED DESCRIPTION OF THE INVENTION

Figure 1:
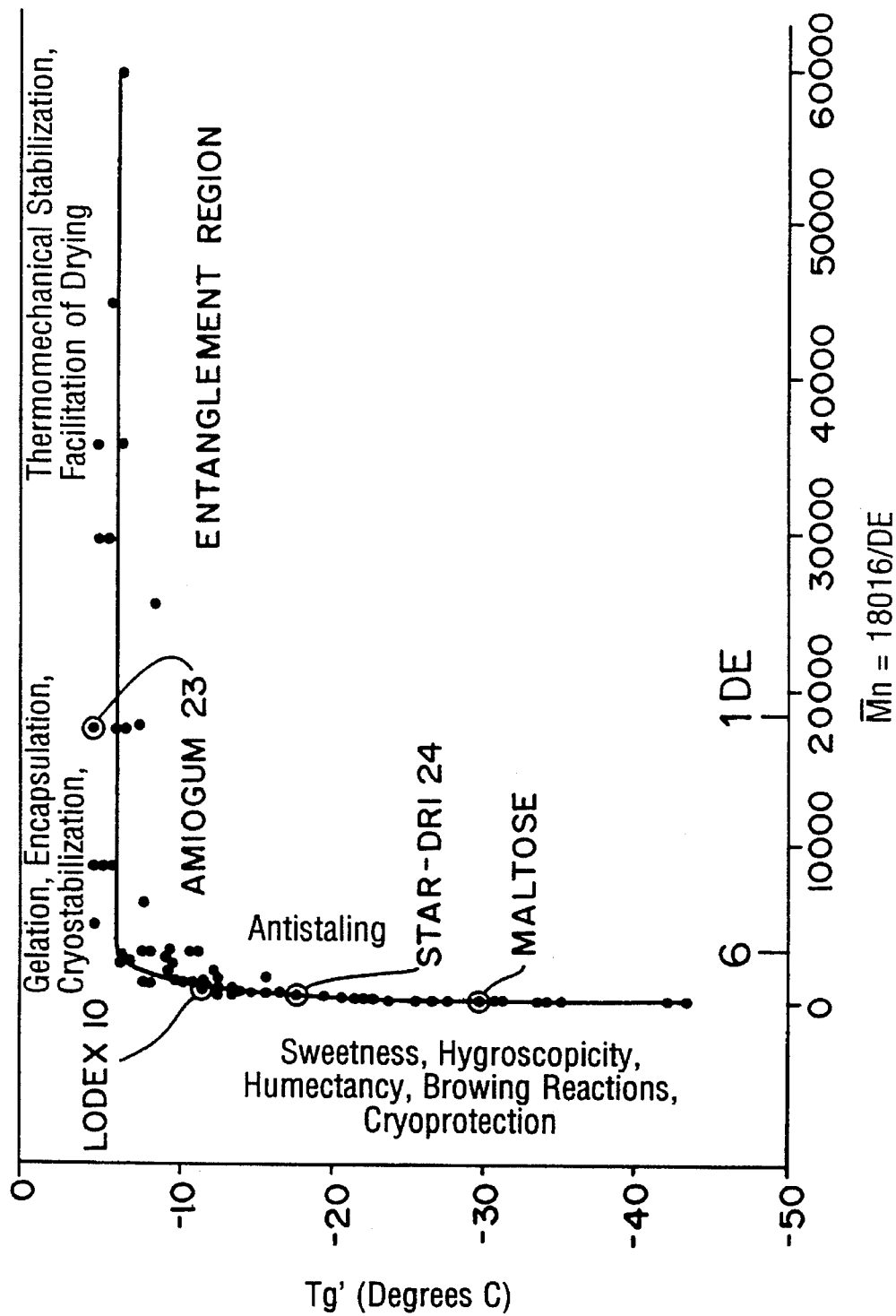
FIG. 1 is a graph showing the relationship between glass transition temperature and number average molecular weight for various carbohydrates.

The present invention provides a shelf stable, dry, expanded fruit snack product with desirable color, flavor, and nutrient retention of fruit juice and/or vegetable juices. Fruit and/or vegetable juice is admixed with a starch hydrolyzate, preferably a maltodextrin, a gelatinized starch, optional water, optional sugars, and optional baked particulates to obtain a dough or dough-like mixture. The dough or dough-like mixture is subjected to vacuum drying to expand the composition and dry it to a shelf stable moisture content. The starch hydrolyzate and gelatinized starch create a glassy matrix with the fruit juice solids and impart a crispy texture to the final product. The starch hydrolyzate and the gelatinized starch are used in amounts which, in effect, raise the glass transition temperature of the fruit juice to provide a glass transition temperature (Tg) for the final product which is above room temperature, preferably at least about 30° C. and less than or equal to about 60° C. The relative amounts of juice, starch hydrolyzate, gelatinized starch, and optional pre-baked particulates and water may be used to control the final texture, mouthfeel, and cell structure of the final product to resemble that of a cookie, cracker, or expanded snack. A longer lasting mouthfeel is imparted to the snack product by the gelatinized starch. The gelatinized starch, as well as the use of low DE starch hydrolyzates reduces hygroscopicity of the final products and prolongs their shelf life. The use of low DE starch hydrolyzates facilitates dehydration in a vacuum oven because of their lower hygroscopicity than higher DE products such as sugars. The snacks of the present invention may exhibit shelf stable, crispy textures for at least about two months, preferably at least about six months.

The snack products of this invention may be produced from a dough or dough-like mixture comprising about 20% by weight to about 75% by weight of at least one juice or juice concentrate from a fruit or vegetable source. Exemplary fruit juices which may be used include those juices or juice concentrates produced from fruits such as: orange, strawberry, pineapple, pear, apple, raspberry, apricot, prune, white grape, grapefruit, lemon, blueberry, peach, banana, apple, cherry, mango, papaya and mixtures thereof. Exemplary vegetable juices which may be used include those juices or juice concentrates produced from vegetables such as: potato, sweet corn, cauliflower, celery, pea, carrot, sweet potato, yam, squash, green bean, broccoli, spinach, tomato and mixtures thereof. Fruit and vegetable purees, reconstituted fruit and vegetable juices, juices which have been concentrated by evaporating a significant amount of their water content, and subsequently diluted to their usual strength through the addition of water, may also be used within the context of this invention.

The water content of the fruit and vegetable juices or juice concentrates used in the present invention may range from about 20% by weight to about 80% by weight. The glass transition temperature of the juices or concentrates decreases with increasing water content. Likewise, the glass transition temperature of the glass matrices formed in the present invention also decreases with increasing water content in the matrix. Accordingly, it is desirable to keep the water content of the dough or dough-like compositions low so that less water needs to be removed to achieve a desired end point moisture content and a resultant glass transition temperature above room temperature, commensurate with shelf stability of the product. However, decreasing the water content of the dough or dough-like mixture may decrease formability or moldability of the mixture. In addition, sufficient water is needed in the dough or dough-like compositions to expand the composition into a cellular or crumb-like structure upon vacuum drying.

Primary components in juices affecting the glass transition temperature are mono- and di-saccharides such as fructose, dextrose, and sucrose. These low molecular weight components lower the glass transition temperature of a carbohydrate mixture which contains them. As reported by Levine and Slade, "A Polymer Physico-chemical Approach To The Study Of Commercial Starch Hydrolysis Products (SHPs)", *Carbohydrate Polymers*, volume 6, pages 213–244 (1986), the characteristic sub-zero glass transition temperature, $Tg'$, of a maximally freeze-concentrated aqueous solution of a carbohydrate or mixture of carbohydrates shows an inverse linear correlation with the dextrose equivalent of the carbohydrate over a DE range of 0.3 to 100. In experiments reported in this paper, the coefficient of correlation between $Tg'$ and DE was minus 0.98. In effect this indicates that virtually all the variation in $Tg'$ was due to variation in DE. As shown in FIG. 1, which is a modified reproduction of the figures from the Levine and Slade article, the rate of change of $Tg'$ with number average molecular weight increases very rapidly as the DE decreases and then levels off or plateaus at DE's of about 6 and below. A similar relationship exists for variation of $Tg$, the conventional glass transition temperature, with number average molecular weight. Consequently, it is possible to calculate, with a high degree of accuracy, the glass transition temperature of the glassy matrix produced from any given carbohydrate mixture by calculating the number average molecular weight of the mixture, making due allowance for the water content of the mixture.

The lowest water content necessary to form ice is $Wg'$. It may be determined experimentally in known manner. The glass transition temperature $Tg'$, and in some cases the corresponding water content, $Wg'$ for various fruit juices, fruits, and vegetables are presented in Tables 1, and 2:

TABLE 1

| Glass Transition Temperature Tg' for Various Fruit Juices | | |
|---|---|---|
| Fruit Juice | Tg' °C. | Wg'[1] |
| Orange | −37.5 (±1.0) | 39% |
| Strawberry | −41 and −32.5 | |
| Pineapple | −37.5 | |
| Pear | −40 | |
| Apple | −40.5 | |
| Prune | −41 | |
| White grape | −42.5 | |
| Lemon | −43 (±1.5) | |

[1]Wg' = Percent Water in Tg' Glass

TABLE 2

| Glass Transition Temperature Tg' for Various Fruits and Vegetables | | |
|---|---|---|
| Fruit | Tg' °C. | Wg'[1] |
| Strawberry | −41 to −33 | 41%[2] |
| Center | −41 minimum | |
| Outer Tissue | −33 maximum | |

TABLE 2-continued

Glass Transition Temperature Tg' for Various Fruits and Vegetables

| Fruit | Tg' °C. | Wg'[1] |
|---|---|---|
| Blueberry | | |
| Meat | −41 | |
| Skin | −41 and −32 | |
| Peach | −36.5 to −35.5 | 34% |
| Banana | −35 | |
| Apple | −36 to −42 | 31%[3] |
| Cherry | −38.5 | 38% |
| Potato | −11 to −16[2] | |
| Sweet Corn | −14.5 to −8[3] | |
| Cauliflower | −25 to >−10[4] | |
| Stalk | −25 | |
| Head | >−10 | |
| Celery | >−10 | |
| Pea | −25 | |
| Carrot | −25.5 | |
| Green Bean | −27.5 | |
| Broccoli | −26.5 to −11.5[5] | |
| Stalk | −26.5 | |
| Head | −11.5 | |
| Spinach | −17 | |
| Tomato | −41.5 | |

[1]Wg' = Percent Water in Tg' Glass
[2]Depending on variety and fruit tissue
[3]Depending on variety
[4]Depending on tissue location
[5]Depending on age after harvest Subsequent dehydration of the juice-based doughs or dough-like compositions is facilitated by the use of components having a higher glass transition temperature, $T_g'$ and a lower DE. Likewise, maintenance of a desirable expanded shape during dehydration is achieved while minimizing hygroscopicity of the final product. Shelf-stability of a crispy texture and original flavor, nutritive, and flavor attributes are achieved by selecting components which provide a high glass transition temperature and a low moisture content for drying. Preferably, the moisture content is that amount at which the drying rate profile exhibits a characteristic break, or change in slope. Thus, juices which provide the more stable products have the highest value of Tg' (the most important factor) and the lowest Wg' (secondary factor related to the moisture content where a characteristic break occurs in a drying rate profile). For example, stabilization of tomato juice with its low value of Tg' (−41.5° C. for tomato) and facilitation of its drying would require a higher level of starch hydrolyzate, such as maltodextrin, with a greater value of Tg' (lower DE) than would stabilization of spinach juice with its much higher value of Tg' (−17° C. for spinach). Also, juices from the "premium" head portions of cauliflower or broccoli or a mixture of the head juices would dry more easily and result in a more stable product than juice from the whole vegetable (head plus stalk), even if the stalk portions were comminuted to the same particle size as the head portions. The products which would be more difficult to dry and which would be less stable would be derived from the stalk portions alone because of their lower Tg'.

The juice or juice concentrates, starch hydrolyzate, pregelatinized starch, optional water and other optional ingredients are selected to provide a glass transition temperature Tg' for the mixture at a minimum moisture content of Wg' which is preferably in the range of about −18° C. to about −3° C. to facilitate vacuum drying. Use of doughs or dough-like mixtures having a Tg' within this preferred range, at a minimum moisture content of Wg', also provides a glass transition temperature above room temperature, commensurate with shelf stability, in the dried, final product. Generally, the glass transition temperature Tg' for a mixture of carbohydrates is proportional to their relative weight percentages in the mixture.

The glass transition temperature of the final product may be measured using known techniques such as differential scanning calorimetry (DSC), thermal mechanical analysis (TMA), dynamic mechanical analysis (DMA), or by an Instron testing apparatus.

The doughs of the present invention may comprise about 5% by weight to about 25% by weight of at least one starch hydrolysate, preferably a maltodextrin. The more volatile the juice or mixture of juices, the greater the amount of starch hydrolysate used to stabilize the product. The juices are sticky due to the presence of sugars and acids. By combining the juices with the maltodextrin or other starch hydrolysate, the glass transition temperature of the resulting snack food product is raised thereby decreasing the "stickiness" of the juices and increasing glassiness and crispness of the resulting product. The starch hydrolysate preferably has a dextrose equivalent (DE) of less than or equal to about 42, more preferably in the range of about 0.2 to about 26, most preferably from about 4 to about 20. Preferred maltodextrins for use in the present invention have a DE of about 5 to about 15. Commercially available maltodextrins which may be used include Star Dri 5 distributed by A. E. Staley Manufacturing Co., Decatur, Ill. The glass transition temperature Tg' and DE values of exemplary starch hydrolysis products which may be used in the present invention are given in Table 3:

TABLE 3

Glass Transition Temperature Tg' and DE Value For Commercial Starch Hydrolysis Products

| SHP | MANU-FACTURER | STARCH SOURCE | DE | Tg' °C. |
|---|---|---|---|---|
| AmioGum 23 | Amaizo | | 1 | −4 |
| 47TT110 | Staley | potato | 0.6 | −4.5 |
| Paselli SA-2 | AVEBE (1984) | potato (Ap) | 2 | −4.5 |
| Stadex 9 | Staley | dent corn | 3.4 | −4.5 |
| Paselli SA-2 | AVEBE (1987) | potato | 2 | −5 |
| 78NN128 | Staley | potato | 0.6 | −5 |
| 78NN122 | Staley | potato | 2 | −5 |
| V-O Starch | National | waxy maize | | −5.5 |
| N-Oil | National | tapioca | | −5.5 |
| ARD 2326 | Amaizo | dent corn | 0.4 | −5.5 |
| Paselli SA-2 | AVEBE (1986) | potato (Ap) | 2 | −5.5 |
| Glucidex 2B | Roquette | waxy maize | 2 | −5.5 |
| ARD 2308 | Amaizo | dent corn | 0.3 | −6 |
| AB 7435 | Anheuser Busch | waxy/dent blend | 0.5 | −6 |
| Star Dri 1 | Staley (1984) | dent corn | 1 | −6 |
| Crystal Gum | National | tapioca | 5 | −6 |
| Maltrin M050 | GPC | dent corn | 6 | −6 |
| Star Dri 1 | Staley (1986) | waxy maize | 1 | −6.5 |
| Paselli MD-6 | AVEBE | potato | 6 | −6.5 |
| Dextrin 11 | Staley | tapioca | 1 | −7.5 |
| MD-6-12 | V-Labes | MW 13000/Mn 6500 = 2 | 2.8 | −7.5 |
| Capsul | National (1987) | waxy maize | 5 | −7.5 |
| Stadex 27 | Staley | dent corn | 10 | −7.5 |
| MD-6-40 | V-Labs | MW 39300/Mn 27200 = 1.4 | 0.7 | −8 |

TABLE 3-continued

Glass Transition Temperature Tg' and DE Value
For Commercial Starch
Hydrolysis Products

| SHP | MANU-FACTURER | STARCH SOURCE | DE | Tg' °C. |
|---|---|---|---|---|
| Star Dri 5 | Staley (1984) | dent corn | 5 | −8 |
| Star Dri 5 | Staley (1986) | waxy maize | 5.5 | −8 |
| Paselli MD-10 | AVEBE | potato | 10 | −8 |
| Paselli SA-6 | AVEBE | potato (Ap) | 6 | −8.5 |
| α-Cyclo-dextrin | Pfanstiehl | | | −9 |
| Capsul | National (1982) | waxy maize | 5 | −9 |
| Lodex Light V | Amaizo | waxy maize | 7 | −9 |
| Paselli SA-10 | AVEBE | potato (Ap) | 10 | −9.5 |
| Morrex 1910 | CPC | dent corn | 10 | −9.5 |
| Star Dri 10 | Staley (1984) | dent corn | 10 | −10 |
| Maltrin M040 | GPC | dent corn | 5 | −10.5 |
| Frodex 5 | Amaizo | waxy maize | 5 | −11 |
| Star Dri 10 | Staley (1986) | waxy maize | 10.5 | −11 |
| Lodex 10 | Amaizo (1986) | waxy maize | 11 | −11.5 |
| Lodex Light X | Amaizo | waxy maize | 12 | −11.5 |
| Morrex 1918 | CPC | waxy maize | 10 | −11.5 |
| Mira-Cap | Staley | waxy maize | | −11.5 |
| Maltrin M100 | GPC | dent corn | 10 | −11.5 |
| Lodex 5 | Amaizo | waxy maize | 7 | −12 |
| Maltrin M500 | GPC | dent corn | 10 | −12.5 |
| Lodex 10 | Amaizo (1982) | waxy maize | 12 | −12.5 |
| Star Dri 15 | Staley (1986) | waxy maize | 15.5 | −12.5 |
| MD-6 | V-Labs | | | −12.5 |
| Maltrin M150 | GPC | dent corn | 15 | −13.5 |
| Maltoheptaose | Sigma | | 15.6 | −13.5 |
| MD-6-1 | V-Labs | MW 1030/Mn 880 = 1.2 | 20.5 | −13.5 |
| Star Dri 20 | Staley (1986) | waxy maize | 21.5 | −13.5 |
| Maltodextrin Syrup | GPC | dent corn | 17.5 | −14 |
| Frodex 15 | Amaizo | waxy maize | 18 | −14 |
| Maltohexaose | Sigma | | 18.2 | −14.5 |
| Frodex 10 | Amaizo | waxy maize | 10 | −15.5 |
| Lodex 15 | Amaizo | waxy maize | 18 | −15.5 |
| Maltohexaose | V-Labs | | 18.2 | −15.5 |
| Maltrin M200 | GPC | dent corn | 20 | −15.5 |
| Maltopentaose | Sigma | | 21.7 | −16.5 |
| Staley 200 | Staley (1987) | corn | 26 | −17 |
| Maltrin M250 | GPC (1987) | dent corn | 25 | −17 |
| Maltrin M250 | GPC (1982) | dent corn | 25 | −17.5 |
| N-Lok | National | blend | | −17.5 |
| Staley 200 | Staley | corn | 26 | −19.5 |
| Maltotetraose | Sigma | | 27 | −19.5 |
| Frodex 24 | Amaizo (1987) | waxy maize | 28 | −19.5 |
| Frodex 24 | Amaizo (1982) | waxy maize | 28 | −20.5 |
| Frodex 36 | Amaizo | waxy maize | 36 | −21.5 |
| DriSweet 36 | Hubinger | corn | 36 | −22 |
| Maltrin M365 | GPC | dent corn | 36 | −22.5 |
| Staley 300 | Staley | corn | 35 | −23.5 |
| Globe 1052 | CPC | corn | 37 | −23.5 |
| Maltotriose | V-Labs | | 35.7 | −23.5 |
| Frodex 42 | Amaizo (1982) | waxy maize | 42 | −25.5 |
| Frodex 42 | Amaizo (1987) | waxy maize | 42 | −25.5 |
| Neto 7300 | Staley (1987) | corn | 42 | −25.5 |
| Staley 1300 | Staley (1987) | corn | 43 | −26 |
| Neto 7300 | Staley (1982) | corn | 42 | −26.5 |
| Globe 1132 | CPC | corn | 43 | −27.5 |
| Staley 1300 | Staley (1982) | corn | 43 | −27.5 |
| Neto 7350 | Staley | corn | 50 | −27.5 |
| Maltose | Sigma | | 52.6 | −29.5 |
| Globe 1232 | CPC | corn | 54.5 | −30.5 |
| Staley 2300 | Staley | corn | 54 | −31 |
| Sweetose 4400 | Staley | corn | 64 | −33.5 |
| Sweetose 4300 | Staley | corn | 64 | −34 |
| Globe 1642 | CPC | corn | 63 | −35 |
| Globe 1632 | CPC | corn | 64 | −35 |
| Royal 2626 | CPC | corn | 95 | −42 |
| Glucose | Sigma | corn | 100 | −43 |

Sugars may optionally be included in the fruit juice doughs of the present invention to control texture and sweetness of the final product. Exemplary sugars which may be used include sucrose, fructose, lactose, dextrose, galactose, maltose, or mixtures thereof. Exemplary sources of fructose include invert syrup, corn syrup, high fructose corn syrup, molasses, brown sugar, maple syrup, mixtures thereof, and the like.

The sugar may be admixed with the other ingredients in either solid or crystalline form, such as crystalline or granulated sucrose, granulated brown sugar, or crystalline fructose, or in liquid form, such as sucrose syrup or high fructose corn syrup.

Crystalline or granulated sucrose alone or with other sugars is preferred in the present invention. The sucrose content may, for example, be at least about 80% by weight, based upon the total sugar solids content of the optionally added sugars. The balance of the sugar solids may comprise fructose, dextrose, lactose, maltose or mixtures thereof, for example. Sugar granulations which may be used range, for example, from about 4X to about 12X.

Exemplary amounts of the optional sugars may range up to about 25% by weight based upon the weight of the dough or dough-like mixture.

The dough or dough-like mixtures used to produce the snack food products of this invention may include from about 5% to about 25% by weight of a gelatinized starch ingredient. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for reaction with the starch. The lower the amount of available water, generally, the higher the gelatinization temperature. Gelatinization may be defined as the collapse (disruption) of molecular order within the starch granule manifested in irreversible changes in properties such as granular swelling, native crystallite melting, loss of birefringence, and starch solubilization. The point of initial gelatinization and the range over which it occurs are governed by starch concentration, method of observation, granule type, and heterogeneities within the granule population under observation. Pasting is the phenomenon following gelatinization in the dissolution of starch. It involves granular swelling, exudation of molecular components from the granule, and eventually, total disruption of the granules. See Atwell et al, "The Terminology And Methodology Associated With Basic Starch Phenomenon," *Cereal Foods World,* Vol. 33, No. 3, Pgs. 306–311 (March 1988).

The dextrose equivalent or DE of the gelatinized starch ingredient may, for example, range up to about 0.2. Gelatinized corn starch, wheat starch, rice starch, barley starch, and mixtures thereof are examples of pregelatinized starch ingredients that may be utilized in the present invention to control texture, chewiness and mouthful of the snacks of the present invention. The pregelatinized starch may be added alone, or as a cooked cereal product, such as Cream of Wheat®, produced by Nabisco, Inc. The amount and type of pregelatinized starch ingredient included will depend upon the amount of expansion desired in the resulting product. Gelatinized corn starch causes the product to expand greatly whereas gelatinized wheat starch causes a more moderate expansion. The degree of expansion in the product affects the texture of the resulting product. The more expanded the product is the more soluble it is in the mouth and the less crunchy it is to the taste.

Pregelatinized waxy starches or pregelatinized high amylopectin content starches which may be used in the present invention include pregelatinized waxy maize starch, pregelatinized waxy rice starch, pregelatinized waxy barley starch, and mixtures thereof. The preferred pregelatinized waxy starch for achieving coherence, dough extensibility, and dough machinability is a pregelatinized waxy maize starch such as X-Pand'R starch 287C produced by A. E. Staley Manufacturing Company. The pregelatinized waxy starch preferably has a moisture content of less than or equal to about 5.5% by weight and a pH of about 5 to about 6. The particle size distribution of the pregelatinized waxy starch may be less than or equal to about 20% by weight retained on a 50-mesh screen and less than or equal to about 30% passing through a 200-mesh screen. If the particle size is too small, the pregelatinized starch tends to hydrate predominately on the surface. Increasing the particle size of the pregelatinized waxy starch tends to increase its ability to form homogenous dry blends and reduces its tendency to form lumps. Pregelatinized waxy rice starch may be supplied in the form of a flour produced by Comet Rice Ingredients Co., Los Angeles, Calif.

Water may optionally be used to obtain the doughs of the present invention in an amount ranging from 0% to about 40% by weight, based upon the weight of the dough. The amount of water added is inversely proportional to the percent liquid in the fruit or vegetable juice or juice concentrate. For example, more water may be mixed with juices or concentrates that contain a high percentage of solids and a low percentage of liquids, whereas juices or concentrates that contain a low percentage of solids and a high percentage of liquids will require less water to obtain a desired dough moisture content. The dough mixture should contain a sufficient amount of moisture from all sources, such as the juice, or added water or liquid sugars, so as to enable formation of a substantially homogeneous, uniform cell structure by evaporation of the water during vacuum drying. Exemplary water contents may range from about 15% by weight to about 60% by weight, preferably within the range of about 20% by weight to about 45% by weight, based upon the weight of the dough or dough-like mixture.

Other optional process compatible ingredients that may be present include pre-baked or pre-cooked particulates such as cookie crumbs, cracker crumbs, bread crumbs, nonfat dry milk, and other particulate bulking and texturizing agents. These ingredients may be present in an amount ranging from about 0% by weight to about 20% by weight, based upon the weight of the dough or dough-like mixture.

The products of the present invention may be produced without added shortening fat to obtain no-fat or low-fat snacks, cookies and crackers. Fat or shortening may be present in ingredients used such as cereal sources of gelatinized starch or in particulate ingredients such as cookie crumbs. However, the products of the present invention preferably contain less than about 5% by weight, most preferably less than about 3% by weight, shortening or fat.

The juice-based products may be formed by combining the various ingredients in a batch or upright mixer, a continuous mixer, or an extruder and mixing until a homogeneous dough or dough-like mixture is obtained. The dry ingredients may be dry blended and then admixed with fruit juice and optional other liquid ingredients to obtain the dough. The ingredients are preferably mixed until the resulting dough is quite "stiff" as opposed to sticky. The dough may then be formed into pieces by rotary molding. Alternatively, the dough may be sheeted by counterrotating rollers and then cut into bite size or snack size pieces using a reciprocating or rotary cutter. These dough pieces may then be placed on a tray or continuous moving belt for drying and expansion in a vacuum oven.

In other embodiments of the present invention, a dough, batter, dough-like or slurry-like mixture may be shaped or formed into pieces within the vacuum dryer. For example, a dough or slurry-like mixture may be deposited continuously or intermittently via a nozzle onto a continuous moving belt. The belt may contain mold cavities for receiving the dough or slurry-like mixture and shaping it while it dries and expands within the vacuum oven. The molds may impart a cookie, cracker, or snack-like shape to the dough mixture as it expands within the mold. In other embodiments of the invention, longitudinal and/or horizontal channels may be arranged on the continuous conveyor for shaping of the dough into sheet-like or strip-like form as it expands and dries while passing through the vacuum dryer. The strips or sheets of expanded dough may be cut, by means of a reciprocating cutter for example, upon exit from the vacuum dryer into snack size or cookie-like or cracker-like pieces. Cutting of the product may also be performed within the vacuum belt dryer.

The vacuum belt dryer may be heated by one or more microwave or heated plates as a source of energy for dehydrating and expanding the dough. The heat source may be above, and/or below the dough. Preferably, heating occurs both above and below the dough for more uniform drying and expansion. The vacuum dryer may include one or more cooling zones at the downstream end of the dryer for setting the shape and making it more amenable for cutting. The heating plates may heat the doughs by contact, conduction, or convection heating. The temperature of the heat sources may generally be set considerably higher than the desired maximum product temperature. Exemplary temperatures for the heat source may range, for example, from about 85° C. to about 200° C.

Figure 2:
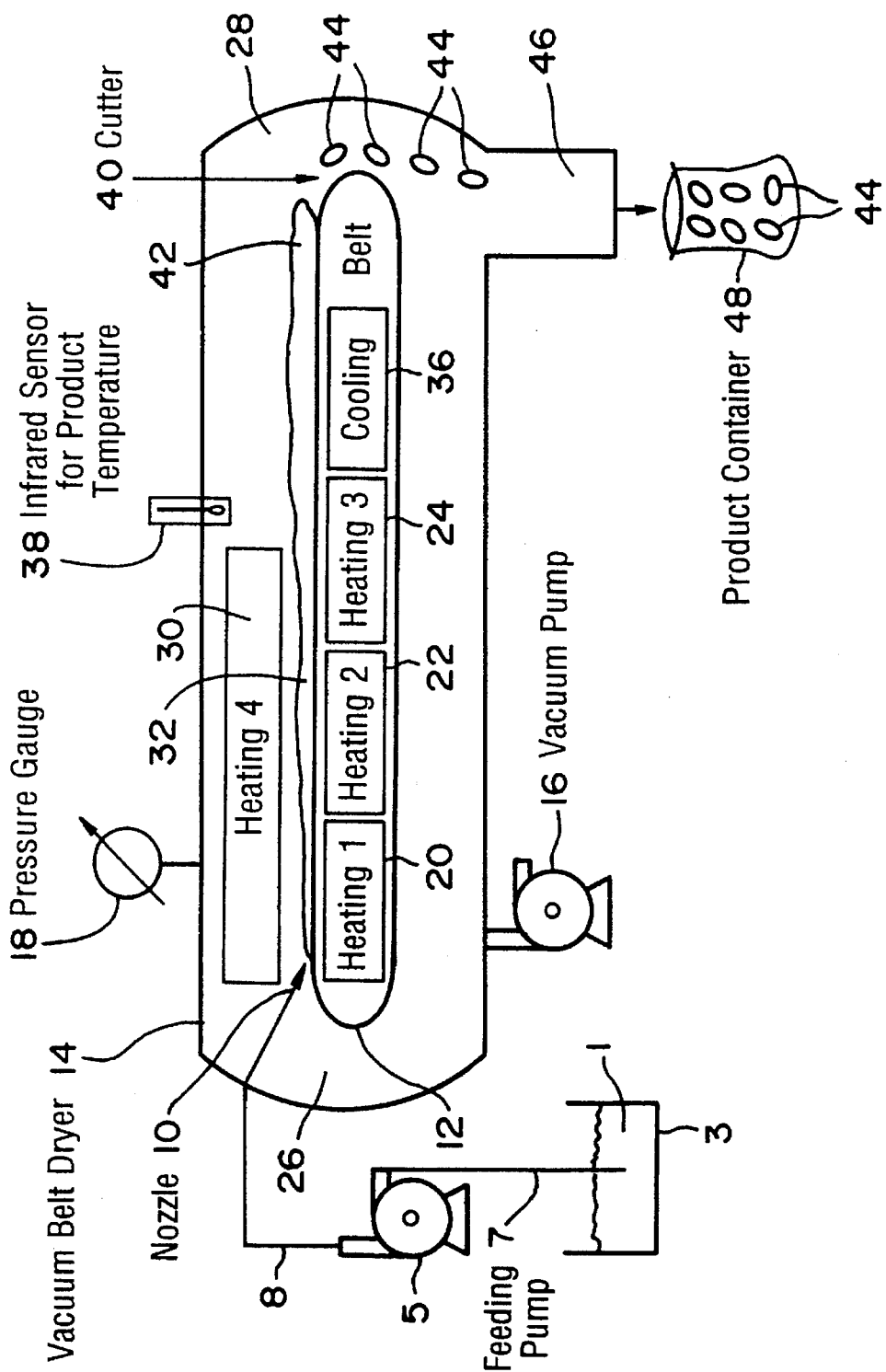
FIG. 2 is a schematic diagram showing apparatus which may be used to produce juice based snacks in accordance with the present invention.

As shown schematically in FIG. 2, a dough mixture 1 may be fed from a batch mixer 3 by means of a pump 5 and conduits 7, 8 to a nozzle 10 for depositing onto a continuous moving belt 12 located within a vacuum belt dryer 14. A vacuum pump 16 may be used to create a desired vacuum, as measured by the vacuum belt dryer pressure gauge 18. Heating plates 20, 22, 24 may be located within the continuous loop of the belt 12 for heating the dough as it passes from the upstream end 26 to the downstream end 28 of the vacuum belt dryer 14. An upper heating plate 30 or microwave source is located above the expanding dough 32 for heating it as well as to keep the surrounding atmosphere above the dewpoint. A cooling plate or zone 36 is located downstream of the lower heating zones or plates 20, 22, 24 for cooling the product to an appropriate degree for cutting. An infrared sensor 38 may be used to monitor the temperature of the product 32. Temperature regulators (not shown) may be used to control the temperatures within the heating zones 20, 22, 24, 30 and cooling zone 36 so as to assure that the product temperature does not exceed a predetermined value which could result in excessive loss of nutritive, color, or flavor components. A cutter 40, such as a guillotine cutter, reciprocating cutter, or stationary knife may be placed at the end of the conveyor belt 12 within the vacuum belt dryer 14 for cutting the expanded, dried dough 42 into snack size pieces 44. The cut pieces 44 may then exit the vacuum belt dryer 14 by means of an exit conduit 46 equipped with an airlock system for packaging in proper air-tight packaging 48.

Commercially available vacuum belt dryers which may be used in accordance with the present invention include System Zwag vacuum band dryers produced by Bucher-Guyer AG, Niederweningen, Switzerland.

The dough or dough-like mixture entering the vacuum dryer may be dried until a final moisture content of less than about 10% by weight, preferably less than about 5% by weight, most preferably less than about 3% by weight is obtained for the snack pieces. The snack products are preferably stored in air tight containers to reduce absorption of moisture from the air and to retain a shelf stable relative humidity or "water activity" of less than about 0.7 for extended periods of time.

The temperatures used in the vacuum dryer should be above the glass transition temperature of the admixture to permit its expansion to a cellular or crumb-like structure. However, it should be below temperatures at which substantial quantities of the color, nutritive, and flavor components of the juices would be lost or destroyed. The pressures used in the vacuum dryer should be sufficiently low so as to permit evaporation of water from the admixture to expand it into a desired cell structure and into a desired shape. Exemplary vacuum dryer product temperatures may range from about 30° C. to about 75° C., preferably from about 35° C. to about 55° C. The vacuum used in the vacuum dryer may range from about 5 mmHg to about 760 mmHg. The lower the pressure and the higher the temperature used in the vacuum dryer, the shorter the residence time needed to obtain a desired end point moisture. Exemplary residence times may range from about 5 minutes to about 6 hours.

In embodiments of the present invention, the dried snack may be coated or enrobed with chocolate fudge, a compound coating, or yogurt or other confectionery coatings to enhance flavor. The coatings may also be used to strengthen the product against breakage and also serve as a moisture barrier.

The following examples illustrate the present invention wherein all parts, percentages and ratios are by weight and all temperatures are in ° F. unless indicated to the contrary:

EXAMPLE 1

The ingredients and their relative amounts which may be used to prepare crispy pineapple juice based snack bars having a yellow color and pineapple flavor in accordance with the present invention are:

| Ingredients | Parts by Weight |
|---|---|
| Pineapple Juice Concentrate (about 38% by weight water) | 73 |
| Maltodextrin, DE = 5, Tg' = −8° C. (Staley Star Dri 5) | 16 |
| Gelatinized Corn Starch (Staley X-P and R) | 11 |

The maltodextrin and gelatinized starch may be dry blended to obtain a substantially homogeneous mixture. The dry blend may then be admixed with the pineapple juice in a Hobart Kneeder and mixed until a substantially homogeneous dough-like mixture is developed. The dough-like mixture may then be pumped to a manifold which feeds the dough-like mixture to two nozzles each having an internal diameter of about 1/16 inch. The nozzles may feed the dough-like mixture into a Dry Lab laboratory band dryer, System Zwag, manufactured by Bucher-Guyer, Switzerland. The feed rate may be about 0.51 lbs./hr. The continuous belt may be equipped with longitudinal projections which create two channels along the length of the belt. The nozzles may feed the dough-like mixture into each channel. The three bottom heating plates, which contact the bottom of the belt may be set from the upstream end to the downstream end at 132° C., 124° C., and 99° C., respectively. The top heating plate, which heats by convection, may be set at about 182° C. An infrared temperature sensor may be used to monitor the product temperature as it passes from the upstream end to the downstream end of the vacuum dryer. The temperature controls may be set so that the maximum product temperature is 53° C. The belt speed may be adjusted to provide a residence time for the dough-like mixture of 19 minutes. The vacuum may be maintained at about 21 mbar. As the dough-like mixture passes from the upstream end to the downstream end, it expands within the channels and is shaped by the channels into a log-like shape. The expanded product may be cooled within the vacuum dryer downstream of the heating plates to a temperature of about 25° C. to about 30° C. The cooled product may then be cut into pieces by means of a reciprocating type cutter located at the end of the continuous belt. The pieces may then exit the vacuum dryer by means of an airlock system which maintains vacuum within the dryer. The snack size pieces may have a length of about 2½ inches and a diameter of about one inch and a moisture content of less than about 3% by weight. The interior of the product may exhibit a distinctly visible cellular structure. The pieces may be enrobed with a yogurt coating in conventional manner and then packaged in air-tight packaging.

EXAMPLE 2

The ingredients and their relative amounts which may be used to prepare crispy orange juice-based crackers having an orange color and orange flavor in accordance with the present invention are:

| Ingredients | Parts by Weight |
|---|---|
| Orange Juice Concentrate (about 46% by weight water) | 35 |
| Sucrose | 15 |
| Maltodextrin, DE = 5, Tg' = −8° C. (Staley Star Dri 5) | 15 |
| Gelatinized Wheat Starch | 11 |

| Ingredients | Parts by Weight |
| --- | --- |
| Water | 24 |

A dough-like mixture may be prepared by preblending the sugar, maltodextrin, and gelatinized wheat starch to obtain a substantially homogeneous dry blend. The orange juice concentrate may be admixed with the water in a Hobart Kneeder to obtain a homogeneous liquid mixture. The dry blend may then be added to the mixer and mixed with the liquid mixture until a substantially homogeneous dough-like mixture is obtained. A vacuum dryer as used in Example 1 may be used to produce the crackers except the nozzles used in Example 1 may be replaced by an oscillating nozzle. The oscillating nozzle or swivel device deposits the dough-like mixture in a wider path across the width of the band so that upon drying and expansion the resulting product resembles a cracker-like shape. The longitudinal barriers for forming the longitudinal channels may be adjusted so as to provide a product width of about 1½ inches to about 1¾ inches. The dough-like mixture may be fed to the vacuum dryer at a rate of about 1.41 pounds per hour. The belt speed may be adjusted to provide a residence time for the dough-like mixture of about 46 minutes. The vacuum may be maintained between about 17 and 30 mbars. The temperature profile from upstream to downstream for the three heating plates may be: bottom (contact) plates 138° C./121° C./93° C., respectively. The top (convection) heating plate temperature may be 176° C. The cooling plate may be set to about 25° C. to about 30° C. The plates may be controlled to provide a maximum product temperature of about 50° C. The dried, expanded product may be cut into cracker-size pieces having a length and width of about 1½ inches to about 1¾ inches and a moisture content of less than about 3% by weight.

EXAMPLE 3

The ingredients and their relative amounts which may be used to prepare crisp strawberry juice-based crackers having a red color and strawberry flavor in accordance with the present invention are:

| Ingredients | Parts by Weight |
| --- | --- |
| Strawberry Juice Concentrate (about 50% by weight water) | 38 |
| Sucrose | 16 |
| Maltodextrin, DE = 5, Tg' = –8° C. (Staley Star Dri 5) | 16 |
| Gelatinized Wheat Starch | 11 |
| Water | 17 |

The dough-like mixture may be prepared, vacuum dried, and formed into cracker-like pieces as in Example 2 except: a) the product residence time may be 50 minutes, b) the vacuum may be maintained at about 48 mbar, c) the temperature profile for the four heating plates and the cooling plate may be: d) bottom (contact) three heating plates from upstream to downstream 123° C./99° C./83° C., top (convection) heating plate 151° C., and cooling plate 25° C.–30° C., and e) the maximum temperature for the product may be 37° C. The final end point moisture content for the product may be less than about 3% by weight.

EXAMPLE 4

The ingredients and their relative amounts which may be used to produce crisp raspberry juice-based cookies having a crumb-like structure, red color and raspberry flavor in accordance with the present invention are:

| Ingredients | Parts by Weight |
| --- | --- |
| Raspberry Juice Concentrate (about 43% by weight water) | 41 |
| Maltodextrin, DE = 5, Tg' = –8° C. (Staley Star Dri 5) | 21 |
| Gelatinized Corn Starch | 14 |
| Sucrose | 10 |
| Cookie Crumbs | 14 |

A dough may be prepared by preblending the dry ingredients and then mixing the dry preblend with the juice concentrate in a Hobart Kneeder at room temperature until a dough having a stiff, non-sticky consistency is developed. The dough may then be formed into a sheet by use of a roller. The sheet may be cut into disks having a diameter of about 1¾" and a thickness of about ¼". The dough discs may then be placed on a tray and put into a vacuum oven for drying and expansion to a crumb-like structure. The residence time in the vacuum oven may be about 4 hours. The vacuum may be maintained at about 30 In. Hg and the oven temperature may be set at 50° C. Upon completion of the drying, the product may be expanded to a cookie-like shape having a maximum height of about ½" and a diameter of about 2". The end point moisture content of the product may be less than about 3% by weight.

EXAMPLE 5

Strawberry-juice based cookies may be prepared as in Example 4 except the dough may be sheeted by counter-rotating rollers, the dough sheet may be cut into pieces using a rotary cutter, and the pieces may then be dried and expanded in a continuous band vacuum dryer to a moisture content of less than about 3% by weight.

EXAMPLE 6

Strawberry-juice based cookies may be prepared as in Example 4 except the dough may be deposited on the vacuum dryer belt as approximately ½" round pieces having a height of about ¼" by intermittent operation of a stationary nozzle. The dough pieces may be expanded to a dome-like shape having a maximum height of about ½", a diameter of about ¾", and a moisture content of less than about 3% by weight.

What is claimed is:

1. A method for producing a shelf stable crispy, expanded snack product from a juice or juice concentrate comprising:
   (a) admixing ingredients to obtain a mixture comprising:
      (i) from about 20% by weight to about 75% by weight of at least one fruit or vegetable juice or juice concentrate,
      (ii) from about 5% by weight to about 25% by weight of at least one starch hydrolysis product having a glass transition temperature Tg' which is substantially higher than that of said at least one juice or juice concentrate, and
      (iii) from about 5% by weight to about 25% by weight of at least one gelatinized starch for increasing the mastication properties of the snack product, said percentages being based upon the weight of said mixture, (b) forming the mixture into pieces, and (c) drying the mixture at subatmospheric pressure to expand it to a cellular structure comprising a glassy matrix without substantial destruction of the nutritive, color and flavor components of the juice or juice concentrate, said snack product having a glass transition temperature Tg of at least about 30° C.

2. A method as claimed in claim 1 wherein forming said pieces comprises injecting said mixture into a mold in a vacuum dryer.

3. A method as claimed in claim 1 wherein forming said pieces comprises depositing said mixture in at least one channel on a continuous belt in a vacuum dryer.

4. A method as claimed in claim 1 wherein the mixture is formed into pieces before said drying.

5. A method as claimed in claim 1 wherein the mixture is formed into pieces during said drying.

6. A method as claimed in claim 1 wherein the expanded mixture is cut into pieces at subatmospheric pressure.

7. A method as claimed in claim 1 wherein said mixture is a dough further comprising cookie crumbs, and the dough is sheeted and cut into pieces prior to said drying.

8. A method as claimed in claim 1 wherein water is admixed with said juice or juice concentrate and the water content of said mixture is from about 20% by weight to about 45% by weight.

9. A method as claimed in claim 1 wherein said at least one starch hydrolysis product has a dextrose equivalent value (DE) of about 0.2 to about 26.

10. A method as claimed in claim 9 wherein said mixture at a minimum moisture content to form ice Wg', has a glass transition temperature Tg' of about −18° C. to about −3° C.

11. A method as claimed in claim 1 wherein said mixture subjected to said subatmospheric drying has a moisture content of about 20% by weight to about 45% by weight, and said drying reduces the moisture content to less than about 3% by weight.

12. A shelf stable, crispy expanded snack comprising a glassy matrix obtained by vacuum drying a composition comprising from about 20% by weight to about 75% by weight of at least one fruit or vegetable juice or juice concentrate, from about 10% by weight to about 25% by weight of at least one starch hydrolysis product having a glass transition temperature Tg' which is substantially higher than that of said at least one juice or juice concentrate, and from about 5% by weight to about 25% by weight of at least one gelatinized starch for increasing the mastication properties of the snack, said expanded snack having a water content of less than about 10% by weight and a glass transition temperature Tg of at least about 30° C.

13. A shelf stable snack as claimed in claim 12 wherein said at least one starch hydrolysis product has a dextrose equivalent value (DE) of about 0.2 to about 26.

14. A shelf stable snack as claimed in claim 12 having a water content of less than about 3% by weight.

15. A shelf stable snack as claimed in claim 12 wherein said at least one starch hydrolysis product is a maltodextrin.

16. A shelf stable snack as claimed in claim 15 wherein said at least one gelatinized starch is a pregelatinized waxy maize starch.

17. A shelf stable snack as claimed in claim 12 further comprising prebaked cookie crumbs.

18. A shelf stable snack as claimed in claim 12 which is coated with a chocolate, compound coating material, or yogurt.

19. A shelf stable snack as claimed in claim 12 having a fat content of less than about 5% by weight.

20. A shelf stable snack as claimed in claim 12 wherein said at least one juice or juice concentrate comprises a mixture of juices or concentrates.

21. A method as claimed in claim 1 wherein at least one sugar in an amount up to about 25% by weight, and up to about 20% by weight of pre-baked or pre-cooked particulates are admixed with said juice or juice concentrate to obtain said mixture, said percentages being based upon the weight of said mixture.

22. A method as claimed in claim 1 wherein the temperature of said mixture during drying is from about 30° C. to about 75° C.

23. A method as claimed in claim 1 wherein said mixture is a dough or a batter.

24. A method as claimed in claim 1 wherein said mixture is slurry.

25. A shelf stable snack as claimed in claim 12 further comprising at least one sugar in an amount up to about 25% by weight, and up to about 20% by weight of pre-baked or pre-cooked particulates, said percentages being based upon the weight of said composition.

* * * * *